Jan. 5, 1965
K. M. PRUETT
3,164,361
VALVED COUPLER
Filed Oct. 2, 1962
2 Sheets-Sheet 1
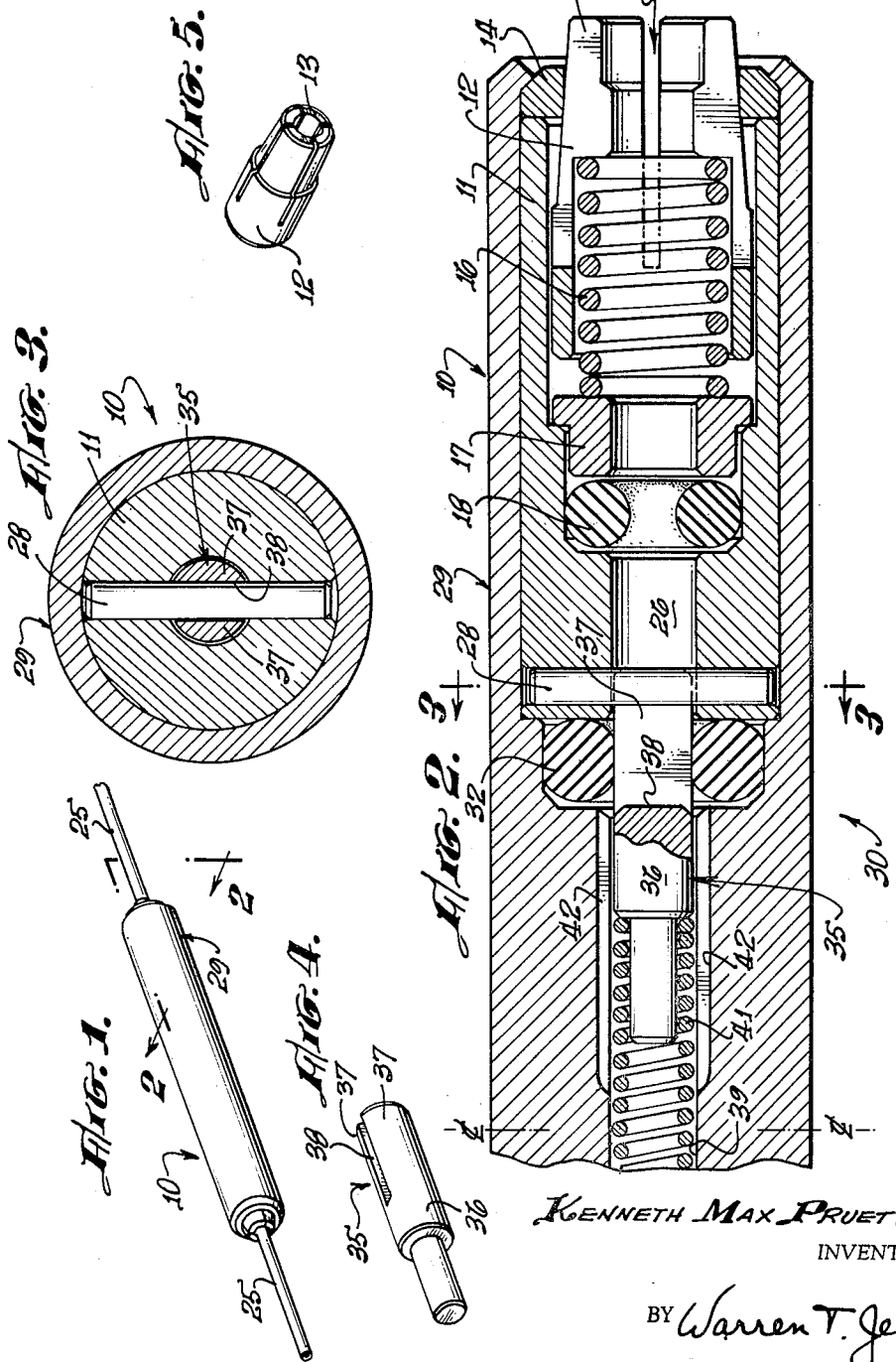
KENNETH MAX PRUETT,
INVENTOR.
BY Warren T. Jessup
ATTORNEY

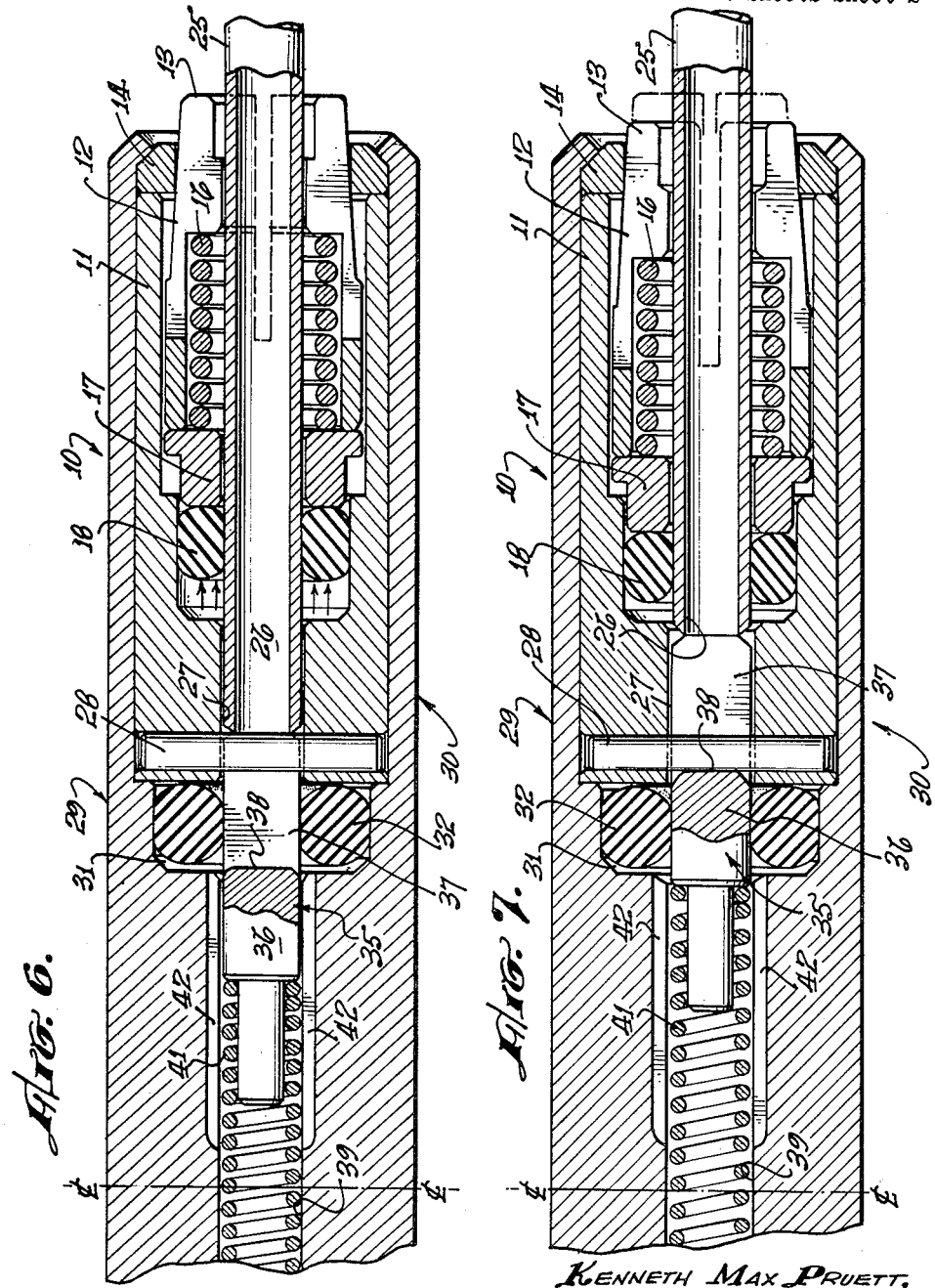

United States Patent Office 3,164,361
Patented Jan. 5, 1965

3,164,361
VALVED COUPLER
Kenneth Max Pruett, San Diego, Calif., assignor to J. C. Pemberton, doing business as Scanivalve Company, San Diego, Calif.
Filed Oct. 2, 1962, Ser. No. 227,741
2 Claims. (Cl. 251—149.6)

This invention relates in general to coupling devices, and more particularly to a valve coupler providing both physical coupling and fluid supply solely by the insertion of a conduit into the coupler.

The broad classifications and the number of specific embodiments of fluid coupling devices is legion. As a very broad classification, there are: (1) permanently secured joints such as pipe fittings, (2) releasable connections such as hose fittings employing gaskets and threaded connections, and, (3) quick coupling devices wherein one plain conduit may be forced into a coupling device and be gripped by the formation of the coupler and sealed against leakage by devices reacting under pressure. It is the latter classification to which the present invention is directed.

Many such quick release coupling devices have been provided, with varying degrees of complexity and with varying degrees of cost. Air hose couplers are a well known example. Furthermore, there are a wide variety of results. That is, not all such quick release coupling devices provide good holding characteristics and good non-leak characteristics.

It is an object of the present invention to provide a quick coupler having the dual function of physically gripping a tube inserted therein, and providing a fluid supply to the tube.

It is another object of the invention to provide a gripping force which increases as the fluid pressure is increased.

It is a further object of the invention to provide such variable gripping force increasing as the piston effect of the conduit increases, without extra apparatus to provide such force.

And it is a still further object of this invention to provide a valve means within the coupler which opens as a function of the insertion of a conduit into the coupler and closes as a function of its withdrawal.

In accordance with these and other objects which will become apparent hereinafter, a preferred form of the present invention is disclosed in the accompanying drawings wherein:

FIGURE 1 is a perspective view of a coupling device according to the present invention, having both inlet and outlet conduits in functional relationship therewith.

FIGURE 2 is a cross section taken along line 2—2 of FIGURE 1, and on an enlarged scale, but having no fluid conduit therein;

FIGURE 3 is a section taken substantially along the line 3—3 of FIGURE 2;

FIGURE 4 is a perspective illustration of a bifurcated valve employed in the coupling device;

FIGURE 5 is a perspective illustration of the collet portion of the device illustrated in FIGURE 2;

FIGURE 6 is a section similar to FIGURE 2, illustrating the internal arrangement of the gripping elements under service conditions with a tube inserted therein; and FIGURE 7 is a view similar to the FIGURE 6 with the holding collet manually released to permit withdrawal of the conduit.

The drawings illustrate the preferred embodiment of the invention as developed for the primary purpose of transmitting fluid pressure rather than for appreciable flow of fluid. Pressure sensing instruments, for example, do not require an appreciable flow of fluid. Wherever it is desirable to connect a pressure sensing device into a pressurized system, the illustrated embodiment of the invention will enable a quick connection of the instrument to the pressure source without the need of manually tightening a gripping device and opening of a valve. Both of these functions are attained as the result of insertion of a tube into the coupling device. Simple modification of the illustrated embodiment of the invention will enable the transmission of a flow of fluid rather than a minimum of fluid for the purpose of pressure sensing. Further, the coupler may be employed solely as a gripping device by the insertion of a solid rod rather than a tube.

In the drawings, the FIGURE 1 is a perspective view of such a coupling device and the interior construction will be understood by reference to FIGURE 2. The right hand end of the device as illustrated in FIGURE 2 is a coupler and is indicated generally by reference character 10. The device of FIGURE 1 is composed of two such couplers symmetrical about the center line symbol of FIGURE 2. Coupler 10 is contained within a housing 11. A collet 12 resides within housing 11 and is constructed in the form usual for collet structures, substantially as illustrated in FIGURE 5. Collet 12 provides a plurality of jaws 13 which are movably mounted in the housing 11 for both longitudinal and radial movements between a first and second extreme position. A cam ring 14 provides a restraining collar for camming the individual jaws of the collet toward one another as they are forced to the right in FIGURE 2 toward the second extreme position. A spring 16 urges the collet toward this second position. The jaws may be opened by forcing the collet to the left toward the first extreme position wherein the jaws have a maximum radial separation and thus provide the largest possible opening for the particular collet.

A follower ring 17 and an O-ring 18 positioned within the housing 11 act as a seal ring piston means. This statement can be better understood by referring to FIGURE 6 and comparing that figure with FIGURE 2. Note that in FIGURE 2 there is no cylindrical object, either tube or rod, within the collet, but that the collet, the spring, the follower ring and O-ring all lie around a common axis and hence are said to define a cradle position 19. This cradle position is the location where the cylindrical device is to be held by coupler 10. In FIGURE 6 a tube 25 is illustrated in the cradle position 19 and is gripped by collet 12. Note in FIGURE 6 the arrows suggesting a pressure upon O-ring 18 and the confinement of that pressure to the exterior of tube 25. Fluid pressure applied to the left side of the O-ring is sealed against leakage, and the O-ring reacts under the pressure as a piston.

In housing 11, opposite from the opening from which collet 12 extends, is a bore 26. Tube 25, when extended into the crade position 19, substantially fills the bore 26 except for a small clearance passageway 27. Prior to placing tube 25 into bore 26, any fluid pressure applied to bore 26 will merely bleed through coupler 10 and be released to atmosphere. No effect whatsoever will be had. However, should the member inserted into bore 26 be a solid rod, or in the case of the illustrated embodiment be a tube leading to a closed instrument where pressure is confined, fluid pressure applied to bore 26 will build up and bleed around the end of the tube between the exterior walls of the tube and the bore 26.

By the insertion of the tube into the cradle position the O-ring 18 becomes an active piston within the cylindrical space. It is an annular piston in an annular space. The pressure escaping through space 27 is confined behind O-ring 18 on the exterior of tube 25 within housing 11. This pressure on the left side of O-ring 18 is greater than the atmospheric pressure existing on the right side of the O-ring and hence the O-ring will slide toward the collet jaw members as illustrated in FIGURE 6. Follower ring 17 is provided to transmit the pressure from O-ring 18 acting as a piston and to compress spring 16. As movement continues under greater fluid pressure, follower ring 17 eventually will abut the collet and provide an unyielding direct drive force transmission.

Therefore, the coupler thus far described and illustrated in the drawing is a quick connect coupler intended primarily for fluid conduits. The coupler comprises a plurality of jaws movably mounted for both longitudinal and radial movements between first and second extreme positions. The jaws are opened to their widest extent in the first position and they clamp upon a conduit or other cylindrical object therein when they are urged toward the second position. The fluid pressure power means in the form of O-ring 18 and its follower 17 are inoperative so long as the central cradle position 19 is able to exhaust fluid pressure to atmosphere, but has the function upon being supplied with confined fluid under pressure of driving the jaws toward the second position.

A pin 28 at the extreme end of the housing 11 acts as a limiting device to prevent the insertion of tube 25 beyond the proper position within bore 26.

Housing 11 and the coupler construction contained therein are carried by a master housing 29. The end of the housing 29 is roll formed to confine housing 11 and cam ring 14 therein.

In addition to providing the self-actuating clamp construction, it is desired to have the application of fluid pressure to the tube 25 be a function of the insertion of the tube and thus enable the two functions to take place simultaneously without manipulation of other valves. A valve 30 is provided for this purpose in the present invention. Valve 30 employs a chamber 31 having an O-ring 32 mounted therein. A valve plug 35 in axial alignment with the axis of the cradle position 19 is positioned for contact by a conduit or cylindrical object inserted into the jaw means. Valve plug 35 has a solid portion 36 with a bifurcated portion 37 at the forward end thereof. A better understanding of the construction of valve plug 35 will be had by referring to FIGURE 4. The bifurcated portion is slotted at 38 and proportioned to fit over the pin 28 as a guide device.

A central passage 39 is a fluid conduit within master housing 29. Conduit 39 contains a spring 41 urging valve plug 35 toward pin 28 to a position wherein solid portion 36 is centered in the plane of O-ring 32. When portion 36 is seated in O-ring 32 there is a complete seal against the passage of fluid under pressure from conduit 39 to bore 26. O-ring 32 is a tight seal fit within the chamber 31 and fits snugly to the surface of solid portion 36. Hence, when valve plug 35 is urged to the closed position by spring 41 no fluid pressure is admitted into the area of the coupler device.

However, upon the insertion of a cylindrical object, such as tube 25, the valve plug is contacted and pushed back into conduit 39. As seen in FIGURE 2, grooves 42 provide a fluid passage around solid portion 36. It is thus possible for a quantity of fluid to pass the surface of the plug and escape into slot 38 created by the bifurcated nature of portion 37. From slot area 38 the fluid pressure then passes into bore 26 for the purpose described of supplying pressure through tube 25 and also pressure to operate piston O-ring 18.

Prior couplings and devices have had numerous drawbacks believed to be successfully overcome by the present invention. One of the prime benefits of the present invention is the fact that tube 25 may be released from the coupling device without first closing off the pressure source. In fact, removal of the tube causes a closing of the pressure source with substantially no loss of fluid.

To release tube 25, external pressure is applied to collet 12 in a direction opposite to the force of spring 16 or the force applied through O-ring 18. In small tube devices it is possible to release tube 25 by means of the fingernail or a small sharp instrument. In larger devices a mechanical force device may be required.

While the instant invention has been shown and described herein in what is conceived to be the most practical and preferred embodiment, it is recognized that departures may be made therefrom within the scope of the invention which is therefore not to be limited to the details disclosed herein, but is to be afforded the full scope of the following claims.

What is claimed is:

1. A quick connect coupler for a fluid conduit, comprising:

a tubular housing having an open entrance end;

a plurality of jaws having radially interior surfaces jointly defining a cylindrical cradle lying around a common axis of the housing and jaws;

said jaws movably mounted within said tubular housing for longitudinal movement between a first position protruding from said entrance end, and a second position retracted therefrom;

said jaws having exterior cam follower surfaces;

said housing having cam means therein for coacting with the said cam follower surfaces to cause said jaws to close radially as they move from said second toward said first position and to open as the jaws travel in the opposite direction;

an annular piston within said housing axially aligned with the said axis and positioned at the end of said jaws opposite said protruding ends, in drive exerting relationship to move said jaws toward said first position upon activation by fluid under pressure;

said cradle and piston defining a through passageway for the receipt of a tube member inserted therein through said jaws, said piston including means forming a fluid tight seal with said tube;

fluid supply valve means positioned on the side of said piston opposite said jaws and in a position to be contacted by an elongated member inserted through said cradle, said valve means having an open condition upon contact by such elongated member and a closed condition when released; and passageway means from said valve means to said piston;

whereby, an elongated member must be inserted through said jaws and piston to open said valve means and thereby cause a grip movement of the jaws to take place fully upon said member, and whereby the grip of the jaws can be broken only by applying external force to the jaws against the action of said piston to move from said first toward said second condition.

2. A coupler as defined in claim 1 in which said plurality of jaws are joined into a collet form and a coil spring extends from said collet jaw form and against said annular piston;

whereby said jaws are urged toward said first position at all times.

References Cited in the file of this patent

UNITED STATES PATENTS

| 2,086,569 | Meyer | July 13, 1937 |
| 2,179,729 | Rogers | Nov. 14, 1939 |
| 2,631,872 | Wurmser | Mar. 17, 1953 |
| 2,738,803 | Manning | Mar. 20, 1956 |
| 3,057,374 | Gondek | Oct. 9, 1962 |

FOREIGN PATENTS

| 986,768 | France | Apr. 4, 1951 |